US010247337B2

(12) United States Patent
Bachir

(10) Patent No.: US 10,247,337 B2
(45) Date of Patent: Apr. 2, 2019

(54) HOSE END CONSTRUCTION AND FITTING

(71) Applicant: ContiTech USA, Inc., Fairlawn, OH (US)

(72) Inventor: Mohamad Bachir, Medina, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 130 days.

(21) Appl. No.: 15/463,130

(22) Filed: Mar. 20, 2017

(65) Prior Publication Data
US 2018/0266601 A1 Sep. 20, 2018

(51) Int. Cl.
*F16L 33/01* (2006.01)
*F16L 33/30* (2006.01)
*F16L 1/26* (2006.01)
*F16L 33/34* (2006.01)

(52) U.S. Cl.
CPC .............. *F16L 33/30* (2013.01); *F16L 33/01* (2013.01); *F16L 1/26* (2013.01); *F16L 33/34* (2013.01)

(58) Field of Classification Search
CPC ... F16L 1/26; F16L 25/10; F16L 33/01; F16L 33/207; F16L 33/213; F16L 33/34
USPC ...... 285/9.2, 80, 222.1, 222.2, 222.3, 222.4, 285/222.5, 238, 239, 334.5
See application file for complete search history.

(56) References Cited

U.S. PATENT DOCUMENTS

| | | | | |
|---|---|---|---|---|
| 228,161 A * | 6/1880 | Adlam | ................. | F16L 33/213 285/258 |
| 2,032,720 A * | 3/1936 | Sander | ................. | F16L 19/045 285/332.4 |
| 2,315,225 A * | 3/1943 | Rogers | ................. | F16L 33/16 285/239 |
| 2,741,496 A * | 4/1956 | Melsom | ................. | F16L 33/01 285/222.4 |
| 3,117,809 A * | 1/1964 | Smith | ................. | F16L 33/01 285/222.2 |
| 3,307,589 A * | 3/1967 | Sheffield | ............. | F16L 13/0272 138/109 |
| 3,318,620 A * | 5/1967 | Cullen | ................. | F16L 33/01 285/222.5 |
| 3,368,599 A * | 2/1968 | Dailey | ................. | B64C 31/028 244/117 R |
| 3,556,567 A * | 1/1971 | O'Conner | ............. | F16L 13/103 285/331 |

(Continued)

FOREIGN PATENT DOCUMENTS

FR    3007494 A1    12/2014

*Primary Examiner* — Aaron M Dunwoody
(74) *Attorney, Agent, or Firm* — David L. Cate

(57) ABSTRACT

An assembly includes a hose having at least a first bead ring disposed proximate a distal end of the hose, and a tapered fitting defining an axial centerline and distal end of the assembly. The tapered fitting further defines a first outer diameter relative the axial centerline, and a second outer diameter relative the axial centerline. The first outer diameter is greater than the second outer diameter, and the second outer diameter is disposed nearer the distal end. The tapered fitting further defines a hollow channel therethrough which is disposed around the axial centerline. The first bead ring is disposed adjacent the second outer diameter of the tapered fitting and remote from the first outer diameter of the tapered fitting. The large bore hose is sealingly secured upon the tapered fitting by interference fit.

16 Claims, 3 Drawing Sheets

(56) References Cited

U.S. PATENT DOCUMENTS

| | | | | |
|---|---|---|---|---|
| 4,000,920 A | * | 1/1977 | Horvath | F16L 33/01 |
| | | | | 285/222.4 |
| 4,191,217 A | * | 3/1980 | Kadono | F16L 33/01 |
| | | | | 138/109 |
| 4,323,089 A | * | 4/1982 | Kadono | F16L 33/2073 |
| | | | | 138/109 |
| 4,376,548 A | * | 3/1983 | Armstrong | F16L 33/24 |
| | | | | 285/222.1 |
| 4,955,970 A | * | 9/1990 | Kivi | B29C 70/205 |
| | | | | 156/172 |
| 5,062,914 A | * | 11/1991 | Fuchs | B29C 70/86 |
| | | | | 156/169 |
| 6,039,083 A | | 3/2000 | Loper | |
| 6,923,477 B2 | | 8/2005 | Buon et al. | |
| 7,175,208 B2 | | 2/2007 | Belcher | |
| 8,056,934 B2 | * | 11/2011 | Ono | B63B 27/24 |
| | | | | 138/106 |
| 8,205,315 B2 | * | 6/2012 | Mullen | F16C 7/026 |
| | | | | 280/93.511 |
| 8,276,620 B2 | | 10/2012 | Vo | |
| 2004/0066035 A1 | * | 4/2004 | Buon | F16L 33/003 |
| | | | | 285/222.2 |
| 2010/0055363 A1 | | 3/2010 | Chevalier et al. | |
| 2011/0042940 A1 | | 2/2011 | Kozak et al. | |
| 2013/0241197 A1 | * | 9/2013 | Espinasse | F16L 33/01 |
| | | | | 285/222.1 |
| 2015/0345680 A1 | | 12/2015 | Espinasse et al. | |
| 2016/0069494 A1 | * | 3/2016 | Paulo | B21C 37/12 |
| | | | | 285/399 |

\* cited by examiner

HOSE END CONSTRUCTION AND FITTING

FIELD

The field to which the disclosure generally relates is fittings for hoses, and assemblies thereof. More specifically this disclosure relates to tapered fittings made of hard material and hose ends usually made of relatively soft materials (e.g. rubber) and other reinforcements.

BACKGROUND

This section provides background information to facilitate a better understanding of the various aspects of the disclosure. It should be understood that the statements in this section of this document are to be read in this light, and not as admissions of prior art.

Large bore reinforced hose can be utilized in a wide array of applications. One important application for large bore reinforced hose that is of growing importance in the world today is in loading and unloading oil tankers and floating production storage and offloading units (FPSOs). Such hose has an inside diameter of 5 cm or greater and typically has an inside diameter ranging from 20 cm to 80 cm. Such hose for offshore applications is also typically designed to include a floatation medium to provide the hose with sufficient buoyancy so that it will float on the surface of water. Hose for offshore applications typically has reserve buoyancy when filled with sea water which is within the range of 10% to 40%. A reserve buoyancy of at least 20% is frequently demanded by customers. Because vast reserves of petroleum are located under water in many locations around the world including under the North Sea, the Gulf of Mexico, off the coast of Brazil, and off the coast of California there is a growing demand for large bore reinforced floating hose.

Transferring the crude oil from FPSOs to shuttle tankers at sea is an extremely demanding task because of the persisting relative movement between the vessels. During times of adverse weather conditions, such as high waves, high winds, and storms at sea, this task becomes even more difficult. Floating hoses typically run from the bow and/or the stern of FPSOs to shuttle tankers. Modern shuttle tankers may have a bow manifold for charging crude oil, but many conventional shuttle tankers have a charging device consisting of a midship manifold for intake of the oil load. For this reason a relatively long loading hose is needed, from the FPSO-vessel to the midship manifold on the shuttle tanker. The separation between the vessels, between the stern of the FPSO and the bow of the shuttle tanker is generally about 50 to 200 meters, and the extension of the floating hose is normally between about 150 and 300 meters.

When the floating hoses are not being used to transfer petroleum they can be allowed to remain floating on the water after being released from the tankers. However, in such cases where the floating hose is left on the water the floating hose may be damaged by being struck by ships, sea creatures or by the movement from waves in stormy weather. In any case, hose wear occurs due to continual wave action. This can lead to a loss of the buoyancy and/or primary carcass failure and over time the hose can begin sink.

In the alternative, the floating hose can be hoisted onto the FPSO for storage until it is again needed for offloading crude oil to a shuttle tanker. This can be done by using a wench to pull the floating hose onto a reel. This protects the hose from exposure to waves and the inherent wear associated therewith. It also eliminates the danger of the floating hose being struck by a ship as it is floating at sea. However, pulling the hose onto a reel puts the tapered fittings that connect different sections of hose under a tremendous amount of stress. At the point where the coupling is being pulled onto the reel it experiences a particularly high level of stress and compressive forces. Over time, these forces can cause the hose to fail at or near the point where it is attached to a coupling. In any case, large bore reinforced hoses are prone to failure at their tapered fittings. This is also the case where large tensile loads are encountered in catenary and deep water submarine applications.

Today, there is a need for tapered fittings for large bore reinforced hoses that are more resilient and which are capable of being incorporated into hoses that are more durable and capable of being repeatedly pulled onto reels and more resilient to high tension and bending loads. It would accordingly be desirable to develop tapered fittings for large bore reinforced hoses that are more resistant to failure and which have a longer service under harsh service conditions, such as being repeatedly pulled onto reels.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, an assembly includes a hose having at least a first bead ring disposed proximate a distal end of the hose, and a tapered fitting defining an axial centerline and distal end of the assembly. The tapered fitting further defines a first outer diameter relative the axial centerline, and a second outer diameter relative the axial centerline. The first outer diameter is greater than the second outer diameter, and the second outer diameter is disposed nearer the distal end. The tapered fitting further defines a hollow channel therethrough which is disposed around the axial centerline. The first bead ring is disposed adjacent the second outer diameter of the tapered fitting and remote from the first outer diameter of the tapered fitting. The large bore hose is sealingly secured upon the tapered fitting by interference fit. In some cases, the large bore hose includes a plurality of bead rings, and the tapered fitting may include a locking ring. The first bead ring may be positioned adjacent the locking ring.

In some assemblies, the tapered fitting defines a mating surface between the first outer diameter and the second outer diameter, and the mating surface sealingly engages the large bore hose. The mating surface has an angle relative the axial centerline, and the angle is defined by the difference between the first diameter, the second diameter, and axial length of the mating surface. Such angle may be from about 2 degrees to about 20 degrees, or even from about 5 degrees to about 10 degrees.

Some other aspects of the disclosure are assemblies including a hose having three bead rings, and a first bead ring of the three bead rings is disposed proximate a distal end of the large bore hose. The assembly further includes a tapered fitting having a locking ring and defining an axial centerline and distal end of the assembly. The tapered fitting further defines a first outer diameter relative the axial centerline and a second outer diameter relative the axial centerline, the first outer diameter being greater than the second outer diameter. The second outer diameter is disposed nearer the distal end than the first outer diameter, and the tapered fitting further defines a hollow channel therethrough disposed around the axial centerline. The first bead ring is disposed adjacent the locking ring, and the hose is sealingly secured upon the tapered fitting by interference fit.

In some cases, the tapered fitting defines a mating surface between the first outer diameter and the second outer diameter, and the mating surface sealingly engages the hose. The mating surface has an angle relative the axial centerline, the angle being defined by the difference between the first diameter, the second diameter, and axial length of the mating surface. The angle may be from about 2 degrees to about 20 degrees, or even from about 5 degrees to about 10 degrees.

Yet another aspect of the disclosure is a tapered fitting defining an axial centerline and a distal end, as well as a first outer diameter relative the axial centerline and a second outer diameter relative the axial centerline. The first outer diameter is greater than the second outer diameter, and the second outer diameter is disposed nearer the distal end than the first outer diameter. The tapered fitting further defines a hollow channel therethrough which is disposed around the axial centerline. The tapered fitting may include a locking ring. The tapered fitting, may in some cases, define a mating surface between the first outer diameter and the second outer diameter, where the mating surface has an angle relative the axial centerline, and where the angle defined by the difference between the first diameter, the second diameter, and axial length of the mating surface. Such angle may be any suitable angle, such as, but not limited to, from about 2 degrees to about 20 degrees.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
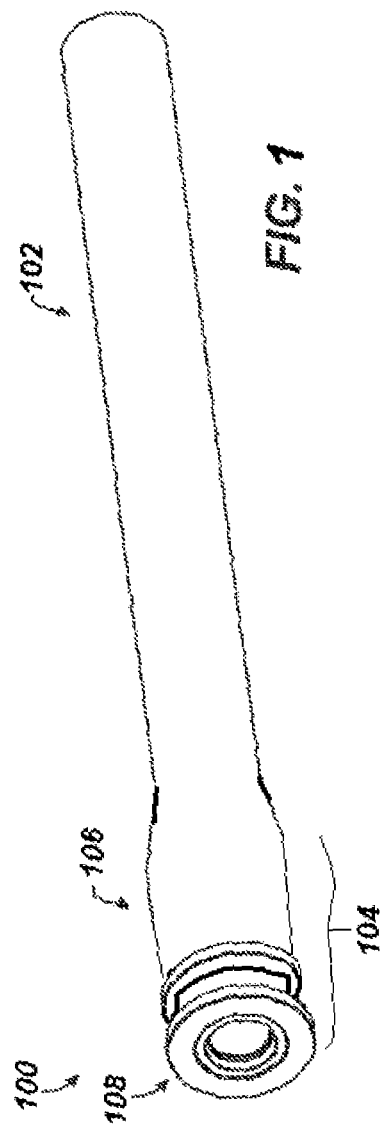
FIG. 1 illustrates in perspective view, an assembly of a hose engaged with a tapered fitting within an end of the hose 102, according to some aspects of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some aspects of the disclosure are fittings for hoses, and assemblies of the fittings and hoses. In some cases the fittings are of a tapered design, made of hard material, and the hose ends may be constructed of relatively soft materials and other reinforcements. Such fittings may be used in conjunction with marine hoses, industrial hoses, hydraulic hoses, pneumatic hose, and the like.

In some aspects, at the hose end, where it engages a tapered fitting, a hard material is incorporated into the hose construction and reinforcement layers may be wrapped around the hard material to form a so-called hard bead. In these aspects, mechanical sealing and locking (prevention of relative movement) is achieved by sliding the fitting relative to the hose end, wherein the soft material between the hard bead and fitting is compressed thus generating interference pressure. The interference pressure may seal the hose with the fitting, thus preventing fluid flowing through the hose and fitting from escaping where the hose engages the fitting. Also, the interference pressure may lock the hose with the fitting thus providing hose/fitting assembly acting as one unit with no relative movement between the hose and fitting.

In some case, a mechanical stop, made from hard material, may be attached (for example by welds, bolts, retaining rings, pipe threads, and the like) to the hard fitting and compressed against the hose end to prevent the hose end from sliding back along the tapered fitting. Use of such a mechanical stop may further provide continual presence of interference pressure to achieve continual sealing and locking.

Some advantages of embodiments of the disclosure include elimination of a need of cement between a hose end and fitting, continual presence of interference pressure which may be adjusted and controlled, and improved control on gage distribution during manufacturing and curing. Some other advantages include elimination of high stresses at cement point, possibility of shorter fittings (thus less weight and cost), as well as reduced mechanical stresses and strains in the assembly. Some additional advantage include controlled preload through interference pressure, better control on gage distribution, a reusable fitting when bolted or pipe threaded, a simple design, a shorter fitting than typical fittings (i.e. less weight), controllable fitting taper angle, improved bead size control, and/or mechanical sealing/restrain.

FIG. 1 illustrates an assembly 100 of a hose 102 engaged with a tapered fitting 104 within end 106 of hose 102, according to some aspects of the disclosure. As illustrated in FIG. 1, tapered fitting 104 has a flanged end 108. The assembly 100 can be used, for example, to conduct petroleum production fluids offshore, although the assembly 100 can be used for other purposes as will be appreciated with the benefit of the present disclosure. To conduct production fluids offshore, for example, the assembly 100 can be used for jumpers, flow lines, risers, or other conduits used in offshore production, and the particular lengths and dimensions of the hose 102 will depend on the desired implementation. As a flow line, for example, the length of the assembly 100 from one flanged end 108 to an opposing distal end may be about 1 km or the like, although any desired length could be used depending on the implementation.

Figure 2:
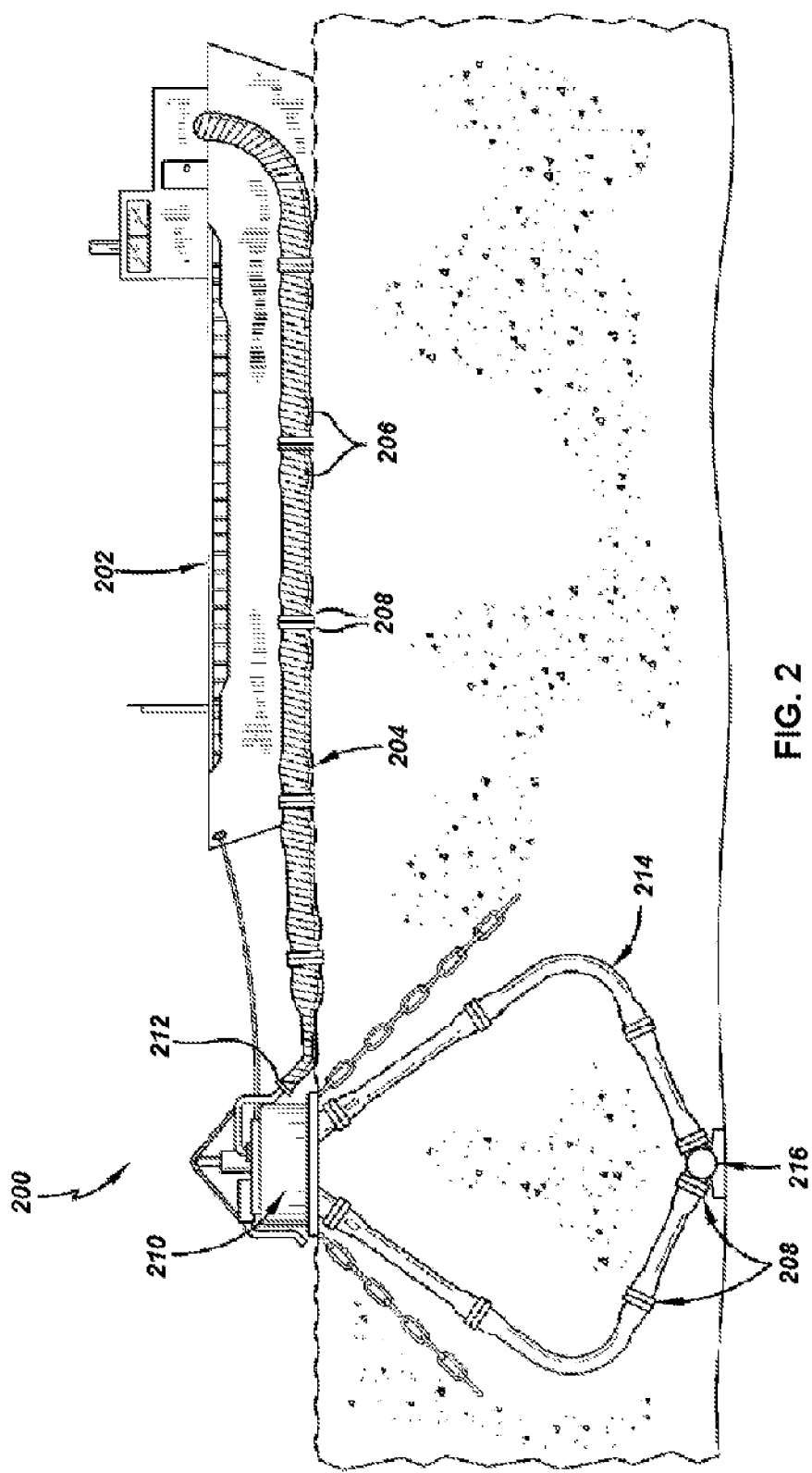
FIG. 2 depicts an offshore petroleum operation by way of example incorporating assemblies of hose engaged with tapered fittings, in accordance with some aspects of the disclosure; and, FIG. 3 shows assemblies according to the disclosure, in a cross-sectional view, which include a hose sealingly secured upon a tapered fitting, according to some aspects of the disclosure.

Now referencing FIG. 2, an offshore petroleum operation 200 is depicted by way of example incorporating assemblies of hose engaged with tapered fittings, in accordance with some aspects of the disclosure. The offshore petroleum operation of FIG. 2 is but one of many applications for embodiments of the disclosure, and is not intended to be limited thereto. Any application in which hose and/or tapered fittings utilized for the transportation of a fluid can utilize the embodiment teachings herein set forth.

The representative field application of FIG. 2 is schematically represented by a tanker or platform 202 on which a control unit or panel is located. Extending from the tanker 202 is a network of floating hose lines 204 comprising end to end connected hose segments 206 joined together by coupled tapered fittings 208. The floating lines 204 may extend to a buoy 210 and connect thereto by a tapered fitting 212. Submarine hose lines 214 depend from buoy 210 and comprise hose segments 206 connected end to end by tapered fittings 208. Submarine hose lines 214 may terminate at a pump station 216. Oil is pumped from station 216 upward through hose lines 214 to the floating lines 204 and therein to the tanker 202. Pursuant to the disclosure, as explained in detail below, hose lines 204 and 214 engage tapered fittings 208 to prevent the fluid from escaping into the sea.

Figure 3:
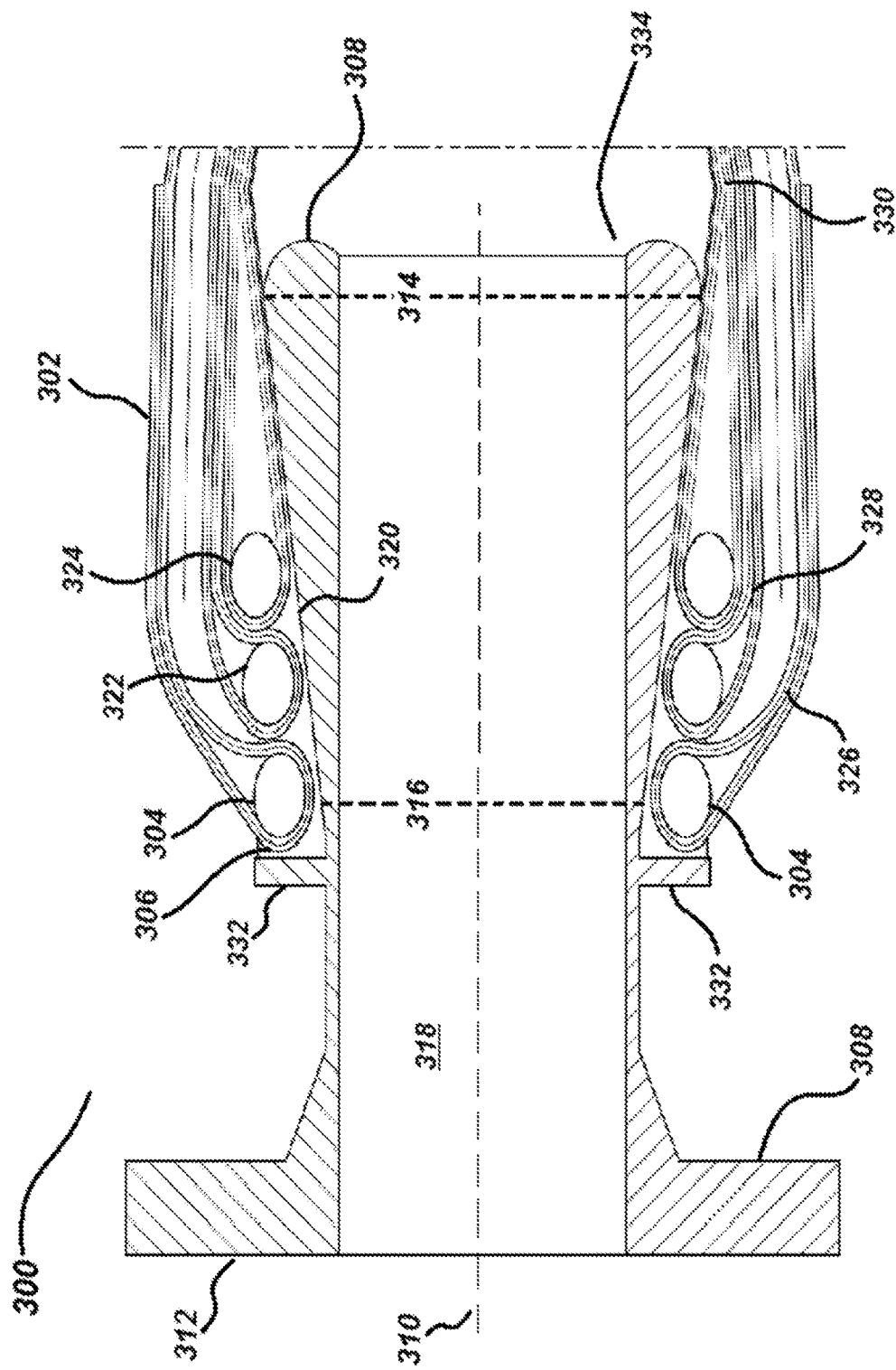

With reference to FIG. 3, assemblies according to the disclosure include a hose sealingly secured upon one or more tapered fitting(s). Such an assembly 300 generally includes a large bore hose 302 having at least a first bead ring 304 disposed proximate a distal end 306 of the large bore hose 302. Tapered fitting 308 defines an axial centerline 310 and distal end 312 of the assembly 300.

Tapered fitting 308 further defines a first outer diameter 314 relative the axial centerline 310, and a second outer diameter 316 relative the axial centerline 310. The first outer diameter 314 is generally greater in value than the second outer diameter 316. The second outer diameter 316 is disposed nearer the distal end 312 than the first outer diameter 314. The tapered fitting 308 further defines a hollow channel 318 therethrough, which is disposed around the axial centerline 310. Further, the first bead ring 304 of tapered fitting 308 is disposed adjacent the second outer diameter 316 and remote from the first outer diameter 314 of the tapered fitting 308.

In such an arrangement as illustrated in FIG. 3, large bore hose 302 is sealingly secured upon the tapered fitting 308 by interference fit upon surface 320 of tapered fitting 308.

The tapered fittings according to the disclosure may be beneficially used in conjunction with hoses of different sizes and that are designed and constructed for a wide variety of purposes. In some aspects, tapered fittings of the disclosure are of particular benefit for use in conjunction with large bore hoses having an inside diameter of at least 5 cm and which typically has an inside diameter ranging from 20 cm to 80 cm and an outside diameter which is within the range of about 40 cm to about 150 cm, such as floating hose that is used in transferring crude oil and other liquids over water (in filling and unloading tanker ships), such as that described above, catenary systems, deep water submarine applications, and the like.

The tapered fittings of the disclosure may be used in conjunction with floating hose having a carcass with an inside and an outside, a floatation medium surrounding the hose carcass and an outer cover. They may also be used in a single carcass hose that is either designed for floating, submarine applications or as a catenary system. This type of floating hose typically has an inside diameter which is within the range of about 30 cm to 80 cm and an outside diameter which is within the range of about 40 cm to about 150 cm. For instance, many commercial floating hoses of this type have an inside diameter of 50 cm (20 inches) and an outside diameter of 95 cm (38 inches).

The carcass is generally of a tubular shape and is typically comprised of a base submarine hose complete with end fittings. The hose carcass may, in some cases, be surrounded by a floatation medium which is typically comprised of several layers of closed cell foam. The closed cell foam can be multiple layers of a polymeric foam, such as polyurethane or polyethylene foam. The floatation medium may have a density and a total volume that is sufficient to provide the floating hose 1 with a reserve buoyancy when filled with sea water which is within the range of 10% to 40%. The floating hose will more typically have a reserve buoyancy when filled with sea water which is within the range of 15% to 35%. In most cases the floating hose will have a reserve buoyancy when filled with sea water of about 25%. In fact, many specifications call for a reserve buoyancy of at least 20%.

The floating hose may include a carcass and can optionally include a second carcass to attain a higher level of safety, performance and better durability. The hose carcass is typically comprised of a cured rubber which can be reinforced with a polymeric fabric, such as nylon or polyester, and/or steel reinforcements. For instance, the hose carcass can be reinforced with Kevlar® aramid fiber. The hose carcass will typically be comprised of a cured rubber, such as natural rubber, synthetic polyisoprene rubber, styrene-butadiene rubber (SBR), polyneoprene rubber, styrene-isoprene rubber, polybutadiene rubber, styrene-isoprene-butadiene rubber, nitrile rubber, carboxylated nitrile rubber, ethylene-propylene-diene monomer rubber (EPDM), or a mixture thereof. The hose carcass will also typically include one or more liners. To provide desired levels of chemical resistance such liners will generally be comprised of a nitrile rubber. To attain excellent heat resistance, oil resistance, and chemical resistance fluoroelastomers, such as Viton® fluoroelastomer, can be used in making the liners as well as thermoplastic liners such as crosslinked polyethylene.

The floatation medium can be provided by wrapping multiple layers of closed cell foam around the hose carcass. A thin layer of rubber is preferably laid between the carcass and the floatation medium. The floatation medium will normally be about 6 cm to about 18 cm thick. In other words, the floatation medium will extend outwardly from the carcass about 6 cm to about 18 cm. The floatation medium will preferably be about 10 cm to about 15 cm thick and will most preferably be about 12 cm to about 14 cm thick.

The floatation medium is surrounded outwardly with the outer cover of the hose. The outer cover is normally comprised of textile breakers with a rubber cover (a textile reinforced rubber cover). The outer cover can optionally include a polyurethane coating. In any case, the outer cover is designed to contain and protect the floatation medium from water damage and environmental conditions.

Referring again to FIG. 3, hose 302 generally includes at least one bead ring 304 disposed in a plane substantially perpendicular to axis 310 of fitting 308, and as a continual structure in the form of a ring around axis 310. In FIG. 3, three such bead rings, 304, 322 and 324 are shown. However, it is within the scope of the disclosure to use any suitable number of beads in the hose. Bead rings 304, 322 and 324 may be encapsulated, or otherwise wrapped with layers included in hose 302, such as layers 326, 328 and 330, respectively.

In some aspects, where a plurality of such beads are incorporated into hose 302, in operation and under pressure from material resident in conduit 318, or other pressure source, all bead ring (such as 304, 322 and 324) are engaged simultaneously creating uniform bead loading and uniform sealing pressure with tapered fitting surface 318. For example, a preload, generated by push, pull, or inflation, may be used to generate interference fit forming pressure.

Some embodiments of the disclosure incorporate a locking ring 332, either formed as part of fitting 308, or otherwise attached thereto. Locking ring 332 may be formed as part of, or welded to, fitting 308, or attached thereto by bolting or threaded connection. Locking ring 332 may also be a plurality of pieces disposed in line around the surface of fitting 308 (for example 3 pieces each covering 120°). Locking ring 332 may be used to provide a preload force to generate interference fit forming pressure. In some embodiments, a safety hump or recessed groove (not shown) may be integrated into fitting surface 320 as locking feature.

As shown in FIG. 3, an angle of surface 320 relative axis 310 is formed between locking ring 332 inward to proximal end 334 of fitting 308. Such angle may be defined by the difference in diameters 314 and 316, and axial length of surface 320. Such angle may be any suitable angle, such as, but not limited to, from about 2 degrees to about 20 degrees (or any values there between), or even from about 5 degrees to about 10 degrees.

In some aspects of the disclosure, cement may be applied upon surface 320 of fitting 308, and then hose 302 disposed over the cement. However, in some other aspects, the use of cement is not necessary, thus providing a cement free interference fit of hose 302 and fitting 308. Also, a cement free fitment eliminates high stresses at the cement points of the assembly.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An assembly comprising:
   a large bore hose comprising at least a first bead ring disposed proximate a distal end of the large bore hose, wherein the first bead ring is encapsulated within a layer of the large bore hose; and,
   a tapered fitting defining an axial centerline and distal end of the assembly, the tapered fitting defining a first outer diameter relative the axial centerline and a second outer diameter relative the axial centerline, wherein the first outer diameter is greater than the second outer diameter, wherein the second outer diameter is disposed nearer the distal end than the first outer diameter, and wherein the tapered fitting defines a hollow channel therethrough disposed around the axial centerline;
   wherein the first bead ring is disposed adjacent the second outer diameter of the tapered fitting and remote from the first outer diameter of the tapered fitting, wherein the large bore hose is sealingly secured upon the tapered fitting by interference fit, and wherein the first bead ring is disposed in a plane perpendicular to the axial centerline of the assembly.

2. The assembly according to claim 1, wherein the large bore hose comprises a plurality of bead rings.

3. The assembly according to claim 2, wherein the large bore hose comprises three bead rings.

4. The assembly according to claim 1, wherein the tapered fitting comprises a locking ring.

5. The assembly according to claim 4, wherein the first bead ring is positioned adjacent the locking ring.

6. The assembly according to claim 1, wherein the tapered fitting defines a mating surface between the first outer diameter and the second outer diameter, the mating surface sealingly engaging the large bore hose, wherein the mating surface has an angle relative the axial centerline, and wherein the angle defined by the difference between the first diameter, the second diameter, and axial length of the mating surface.

7. The assembly according to claim 6, wherein the angle is from about 2 degrees to about 20 degrees.

8. The assembly according to claim 7, wherein the angle is from about 5 degrees to about 10 degrees.

9. The assembly according to claim 6, wherein cement is applied upon the mating surface.

10. The assembly according to claim 6, wherein the mating surface is cement free.

11. An assembly comprising:
  a hose comprising three bead rings, wherein a first bead ring of the three bead rings is disposed proximate a distal end of the large bore hose; and,
  a tapered fitting comprising a locking ring and defining an axial centerline and distal end of the assembly, the tapered fitting defining a first outer diameter relative the axial centerline and a second outer diameter relative the axial centerline, wherein the first outer diameter is greater than the second outer diameter, wherein the second outer diameter is disposed nearer the distal end than the first outer diameter, and wherein the tapered fitting defines a hollow channel therethrough disposed around the axial centerline;
wherein each of the three bead rings is encapsulated within a layer of the hose;
wherein the first bead ring is disposed adjacent the locking ring;
wherein each of the three bead rings is disposed in a plane perpendicular to the axial centerline of the assembly; and,
wherein the hose is sealingly secured upon the tapered fitting by interference fit.

12. The assembly according to claim 11, wherein the tapered fitting defines a mating surface between the first outer diameter and the second outer diameter, the mating surface sealingly engaging the hose, wherein the mating surface has an angle relative the axial centerline, and wherein the angle defined by the difference between the first diameter, the second diameter, and axial length of the mating surface.

13. The assembly according to claim 12, wherein the angle is from about 2 degrees to about 20 degrees.

14. The assembly according to claim 13, wherein the angle is from about 5 degrees to about 10 degrees.

15. The assembly according to claim 12, wherein cement is applied upon the mating surface.

16. The assembly according to claim 12, wherein the mating surface is cement free.

* * * * *